(12) United States Patent
Brower et al.

(10) Patent No.: US 12,253,427 B2
(45) Date of Patent: Mar. 18, 2025

(54) WHEEL BALANCER FORCE TRANSFER ROD AND TRANSDUCER ASSEMBLY

(71) Applicant: Hunter Engineering Company, Bridgeton, MO (US)

(72) Inventors: Nathan Brower, Lake St. Louis, MO (US); William J. Nelgner, St. Charles, MO (US)

(73) Assignee: Hunter Engineering Company, St. Louis, MO (US)

( * ) Notice: Subject to any disclaimer, the term of this patent is extended or adjusted under 35 U.S.C. 154(b) by 567 days.

(21) Appl. No.: 17/653,617

(22) Filed: Mar. 4, 2022

(65) Prior Publication Data

US 2022/0334017 A1 Oct. 20, 2022

Related U.S. Application Data

(60) Provisional application No. 63/174,866, filed on Apr. 14, 2021.

(51) Int. Cl.
*G01M 1/22* (2006.01)
*G01M 1/04* (2006.01)

(52) U.S. Cl.
CPC ............ *G01M 1/225* (2013.01); *G01M 1/045* (2013.01)

(58) Field of Classification Search
None
See application file for complete search history.

(56) References Cited

U.S. PATENT DOCUMENTS

| | | | | |
|---|---|---|---|---|
| 3,910,121 A | * | 10/1975 | Curchod | G01M 1/045 73/477 |
| 3,924,473 A | * | 12/1975 | Maus | G01M 1/045 73/471 |
| 4,173,146 A | * | 11/1979 | Kogler | G01M 1/225 73/462 |
| 4,336,715 A | * | 6/1982 | Arnold | G01M 1/225 73/462 |
| 4,352,291 A | | 10/1982 | Curchod et al. | |
| 5,561,993 A | * | 10/1996 | Elgersma | G01M 1/22 74/572.4 |
| 8,886,491 B2 | | 11/2014 | Feero | |
| 2001/0008085 A1 | * | 7/2001 | Goebel | G01M 1/225 73/462 |
| 2008/0282799 A1 | * | 11/2008 | Douglas | G01M 1/16 73/460 |
| 2010/0043545 A1 | * | 2/2010 | Buzzi | G01M 1/045 73/462 |

* cited by examiner

*Primary Examiner* — Alexander A Mercado
(74) *Attorney, Agent, or Firm* — Sandberg Phoenix & von Gontard P.C.

(57) ABSTRACT

A vehicle wheel imbalance measurement system having a rotationally driven spindle for receiving a vehicle wheel assembly, a motor drive for rotating the spindle and wheel assembly about an axis of rotation, and a set of force transducers for measuring imbalance forces generated by the rotating wheel assembly, and in particular, to a structure within the vehicle wheel imbalance measurement system for conveying a portion of the generated imbalance forces to be measured from the wheel assembly to a fixed ground.

16 Claims, 10 Drawing Sheets

FIGURE 1 - PRIOR ART

WHEEL BALANCER FORCE TRANSFER ROD AND TRANSDUCER ASSEMBLY

CROSS-REFERENCE TO RELATED APPLICATIONS

The present application is related to, and claims priority from, U.S. Provisional Patent Application Ser. No. 63/174,866 filed on Apr. 14, 2021, and which is herein incorporated by reference.

STATEMENT REGARDING FEDERALLY SPONSORED RESEARCH

Not Applicable.

BACKGROUND OF THE INVENTION

The present application is related generally to a vehicle wheel imbalance measurement system having a rotationally driven spindle for receiving a vehicle wheel assembly, a motor drive for rotating the spindle and wheel assembly about an axis of rotation, and a set of force transducers for measuring imbalance forces generated by the rotating wheel assembly, and in particular, to a structure within the vehicle wheel imbalance measurement system for conveying a portion of the generated imbalance forces to be measured from the wheel assembly to a fixed ground.

Vehicle wheel imbalance measurement systems typically consist of a rigid body or housing. A rotationally driven spindle having a flange for securing a vehicle wheel assembly extends outward from the housing, and is supported by an arrangement of bearings in a sub-assembly which is secured within the housing. Portions of the sub-assembly carrying the spindle-supporting bearings are partially isolated mechanically from portions of the sub-assembly secured to the housing. When a wheel assembly is secured to the spindle flange, and the spindle rotationally driven about a longitudinal axis, imbalance forces exerted by the wheel assembly are conveyed through the supporting bearings into the sub-assembly. A portion of the imbalance forces are conveyed as compression and tension loads between the mechanically isolated portions of the sub-assembly connections which include a force transducer to generate a signal representative of the conveyed forces. In one configuration, the connections are defined by coupling rods capable of transferring both tension and compression loads linking the mechanically isolated portions and carrying the force transducers.

In addition to the compression and tension loads intended to be measured by the force transducers associated with the connections, the use of coupling rods can experience bending or flexing forces due to distortions occurring in the sub-assembly during rotational movement or static loading of the wheel assembly. These bending and flexing forces can introduce errors into the measurements generated by force transducers located on the coupling rods. Accordingly, there is a need in the vehicle wheel balancing industry for a wheel imbalance measurement system which provides greater measurement accuracy and which is less susceptible to the introduction of measurement error due to sub-assembly distortions when employing force transducers located on coupling rod connections.

BRIEF SUMMARY OF THE INVENTION

Briefly stated, the present disclosure provides a vehicle wheel imbalance measurement system with an improved coupling rod for conveying compression and tension loads between mechanically isolated portions of an internal sub-assembly. The coupling or force transfer rods are each configured with a pair of reduced-diameter regions or channels, defining a central longitudinal segment of the rod over which bending moments are minimized. Force transducers secured to the rods at the central longitudinal segment experience minimal forces imparted by bending or flexing of the rods due to distortions occurring in the internal sub-assembly during rotational movement of the wheel assembly.

In one embodiment, the force transducers assemblies secured to each coupling or force transfer rod are annular or ring-shaped piezoelectric elements disposed coaxially about the central longitudinal segments. A preload force is applied to the piezoelectric elements by a longitudinally symmetric axial arrangement of annular spacers, washers, and Belleville washers retained between a pair of nuts threaded onto each coupling or force transfer rod.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
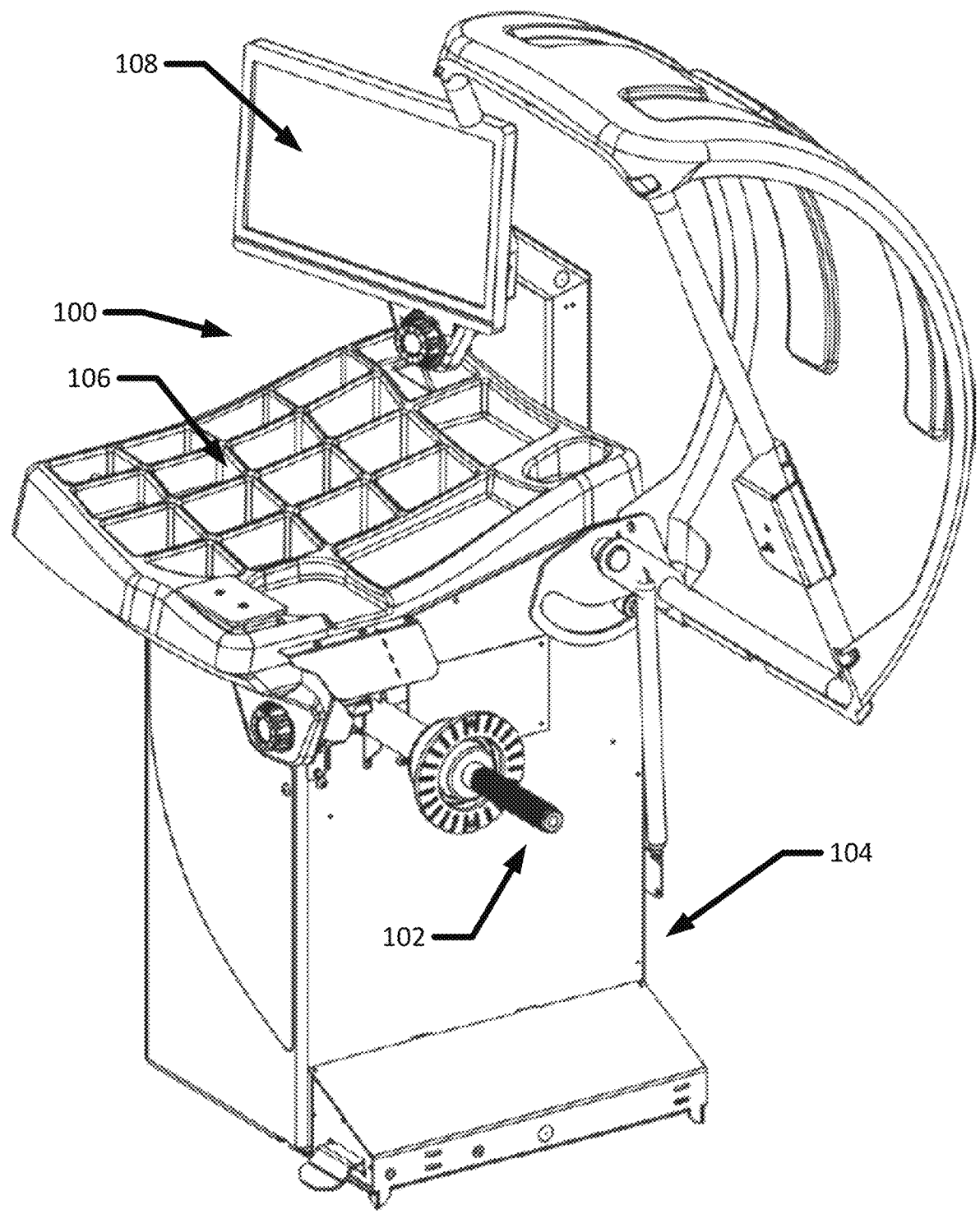
FIG. 1 is a perspective view of a prior art wheel balancer system.
Figure 2:
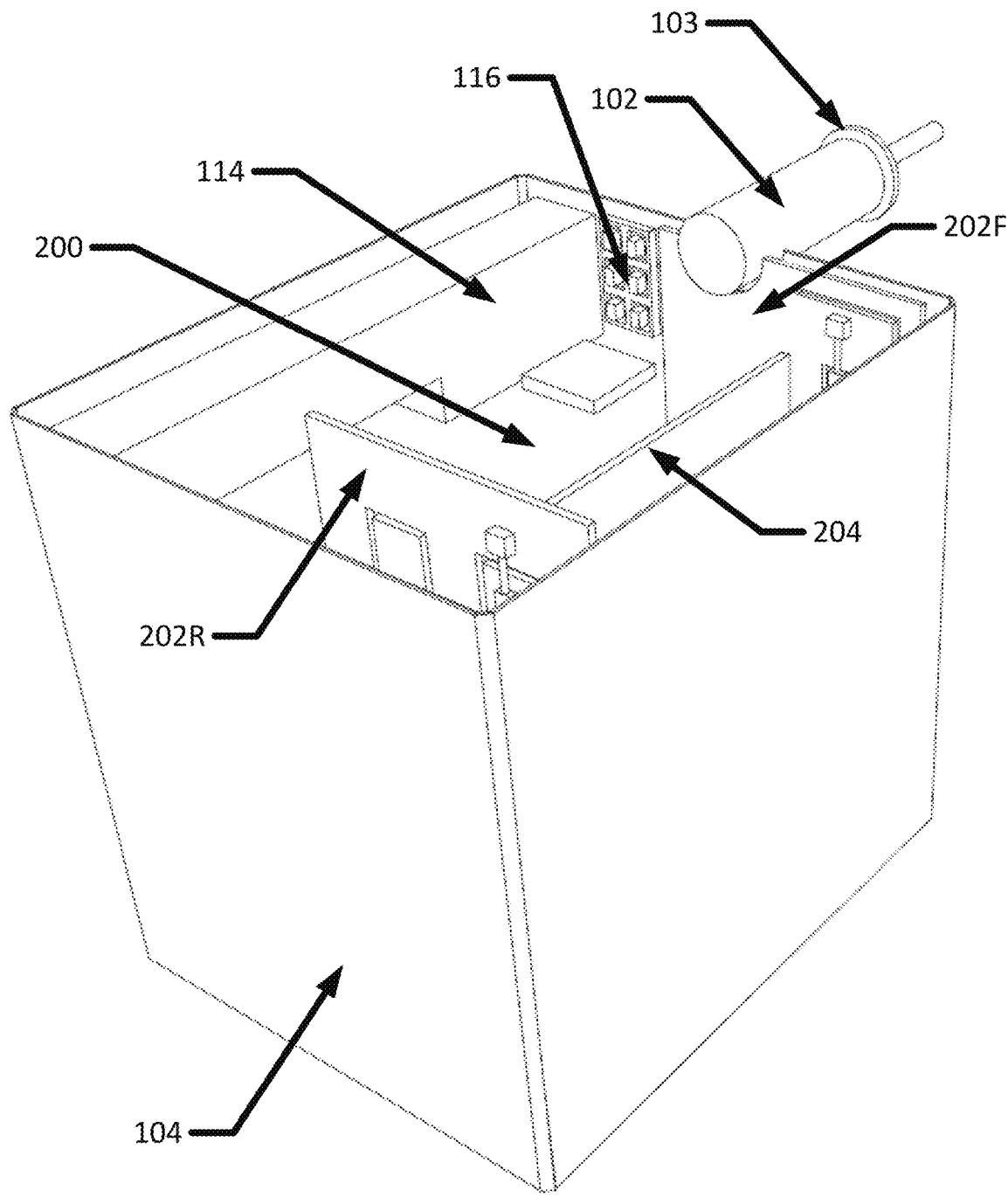
FIG. 2 is a perspective view of the internal components of a wheel balancer system of the present disclosure, with the housing removed.

The present disclosure is directed towards components for use in a wheel balancing machine 100 such as shown at FIGS. 1 and 2, having a spindle 102 supported by a housing 104. During operation, a wheel assembly is secured to the spindle 102 at a flange 103, which is rotationally driven about a longitudinal axis, while forces exerted by the wheel assembly are measured as they are transmitted from the spindle to the housing 104 through an internal sub-structure 200 commonly referred to as a "vibration structure" contained within the housing 104. In general, the housing 104 is mechanically grounded, meaning that it is of a sufficient strength to be substantially non-deformable with respect to the forces imposed on it during wheel balance measurement operations, thereby providing a reference structure to facilitating accurate force measurements.

In addition to supporting the spindle 102 via the vibration structure 200, the housing 104 provides for a top tray or surface 106, typically including a plurality of compartments for storing imbalance correction weights, as well as mounting for an interactive display device 108 and/or other means for operator interaction, such as a console, keyboard, etc. Mechanical and electrical components such as drive motors, belts and pulleys, pneumatic actuators, power distribution systems 114, and control circuits 116 are disposed within the housing 104, operatively interconnected as required for typical operation of a wheel balancing machine.

Figure 3:
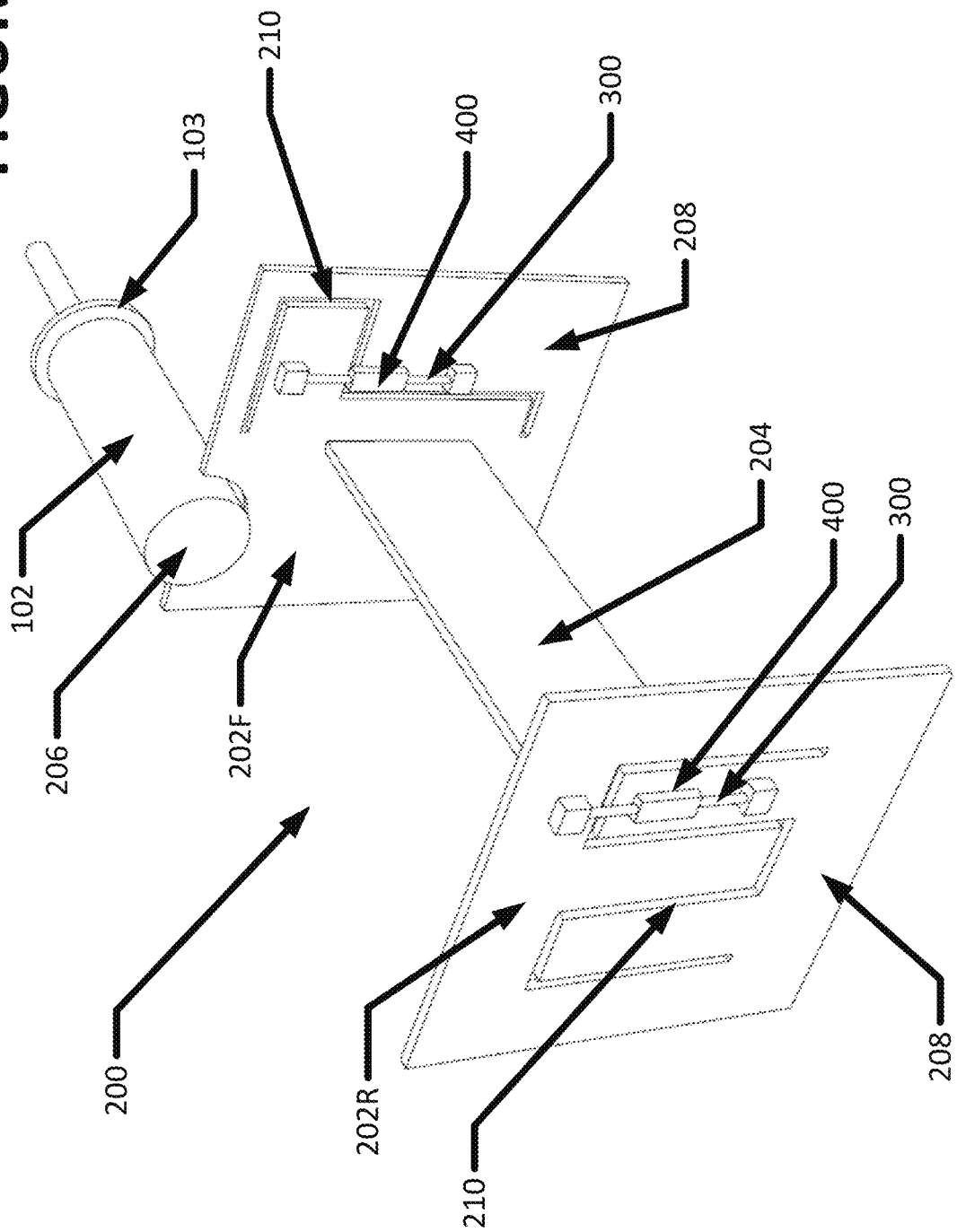
FIG. 3 is a perspective view of a vibration structure of the present disclosure supporting a rotating spindle of a vehicle wheel balancer.

Turning to FIG. 3, an exemplary vibration structure 200 is shown which consists of parallel front and rear planar members 202F, 202R coupled together by a perpendicularly oriented brace member 204. The front planar member 202F is oriented orthogonal to the rotational axis of the spindle 102, and supports one end of the spindle 102 within the housing 104 by means of a bearing assembly 206. Those of ordinary skill in the art will recognize that other vibration structures can be employed which do not utilize or require front and rear planar members oriented as described above. To secure the vibration structure 200 within the housing 104, the front and rear planar members 202F, 202R are affixed to the housing 104 at one or more attachment regions 208. Each of the front and rear planar members 202F, 202R further includes an arrangement of excised channels 210 configured to partially isolated the attachment regions 208 from the forces transmitted by the spindle 102 into the vibration structure 200, while retaining structural rigidity. Those of ordinary skill in the art will recognize that the specific arrangement and number of excised channels 210 can vary from that shown in the Figures while still functioning to partially isolate the attachment regions 208 from the transmitted forces without departing form the scope of the present disclosure.

To measure forces transmitted from the rotating spindle 102, each of the front and rear planar members 202F, 202R includes at least one force transfer rod 300 secured between a region subjected to the transmitted forces from the spindle 102 and an associated attachment region 208 affixed to the housing 104. As shown in the figures, the force transfer rods are arranged parallel to each other, but are not required to be so oriented. Parallel or perpendicular relative orientations are preferred because this allows for a simplification of the mathematical equations utilized in evaluating the measured force components transferred through the force transfer rods. One of ordinary skill in the art can readily appreciate that similar measurement results can be obtained from non-parallel or non-perpendicular orientations of force transfer rods by appropriate mathematical manipulations.

Figure 4:
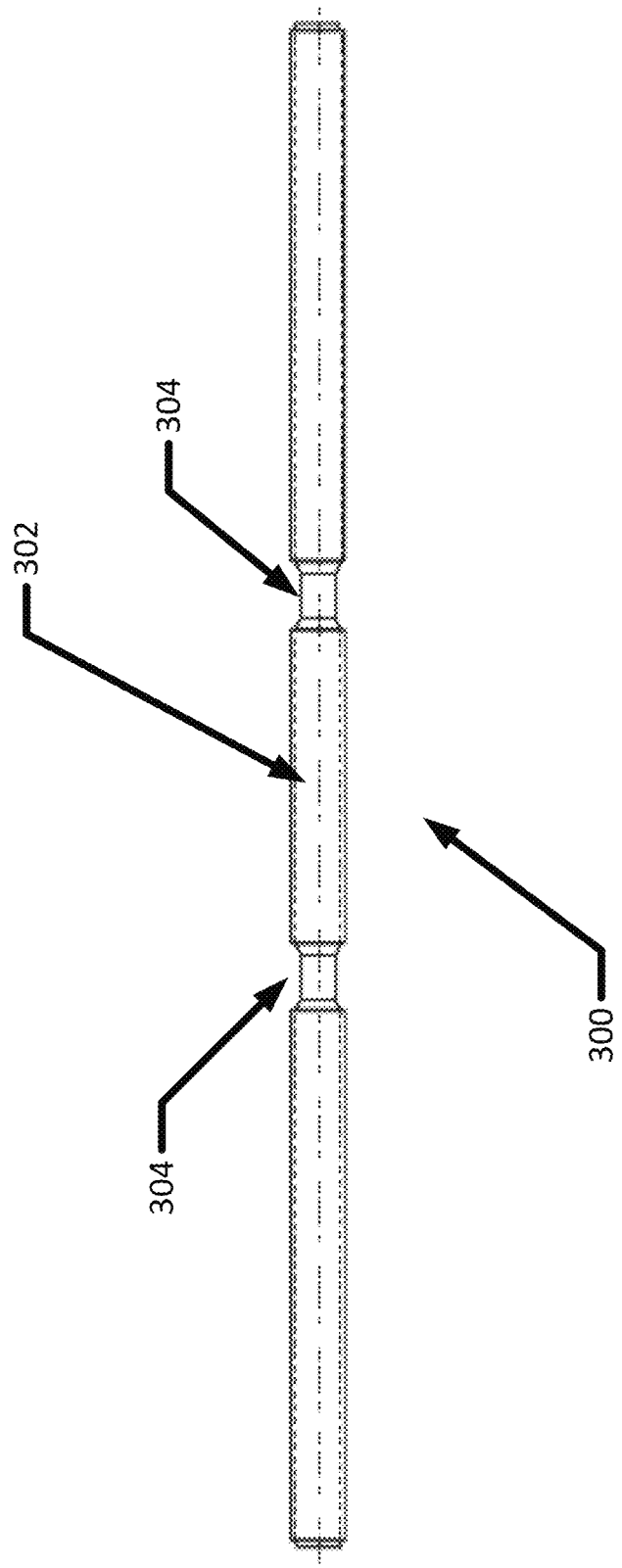
FIG. 4 is a plan view of a force transfer rod of the present disclosure.

In one embodiment, each force transfer rod 300, is configured as shown in FIG. 4 with a longitudinally centered segment 302 of minimum bending moment delimited by a pair of longitudinally spaced annular constrictions 304 functioning as flex regions which provide radial compliance while transferring axial loads. It will be understood that while the flex regions shown and described herein are formed as annular constrictions 304 in the force transfer rods 300, alternative implementations which achieve the same function are possible. For example, the force transfer rods 300 can include longitudinal surface slots, radial bores, or be constructed from different materials to provide compliance in a radial direction while transferring axial loads through the longitudinally centered segment 302. Bending moments exerted on the force transfer rods 300 are greatest at the fixed opposite ends, and are minimized through the central longitudinal segment 302 located between the longitudinally spaced annular constrictions 304, which allow the force transfer rod 300 to flex, isolating the central longitudinal segment 302 from lateral (radial) forces while transmitting compression and tension forces (axial loads).

At least one force transducer 400 is disposed within a protective housing 401 on each force transfer rod 300 within the longitudinally centered segment 302. Each force transducer 400 and is configured to generate an output signal representative of the compression and/or tension forces transferred by the associated force transfer rod 300, such as may occur during rotational movement of the spindle 102. By positioning each force transducer 400 at or near the point of minimum bending moment along the longitudinal length of the associated force transfer rod 300, the resulting output signals are representative of the compression and/or tension forces, with force contributions due to bending or flexing of the force transfer rod minimized.

Figure 5:
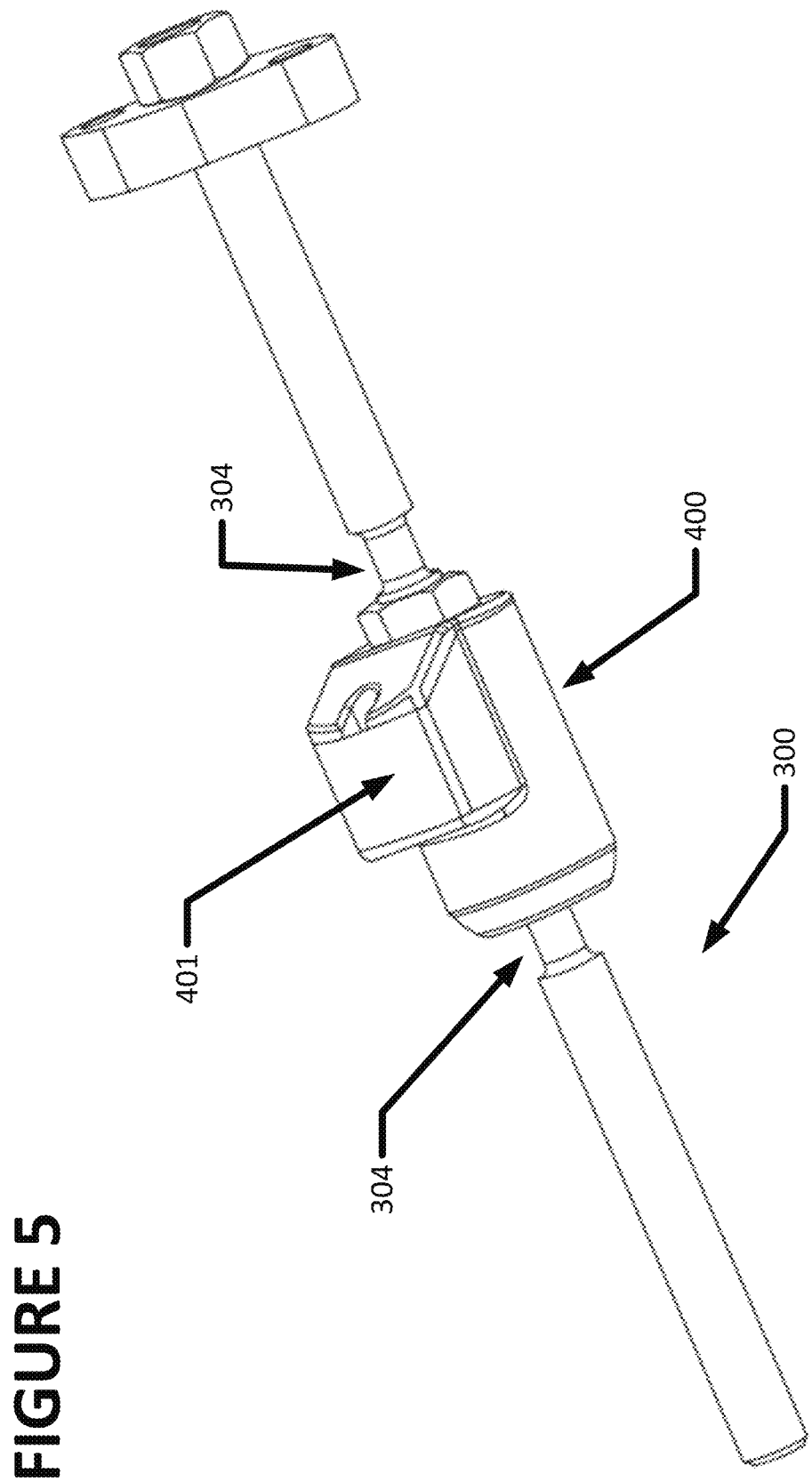
FIG. 5 is a perspective view of a force transfer rod of FIG. 4 with a force transducer assembly secured to a longitudinally centered segment.
Figure 6:
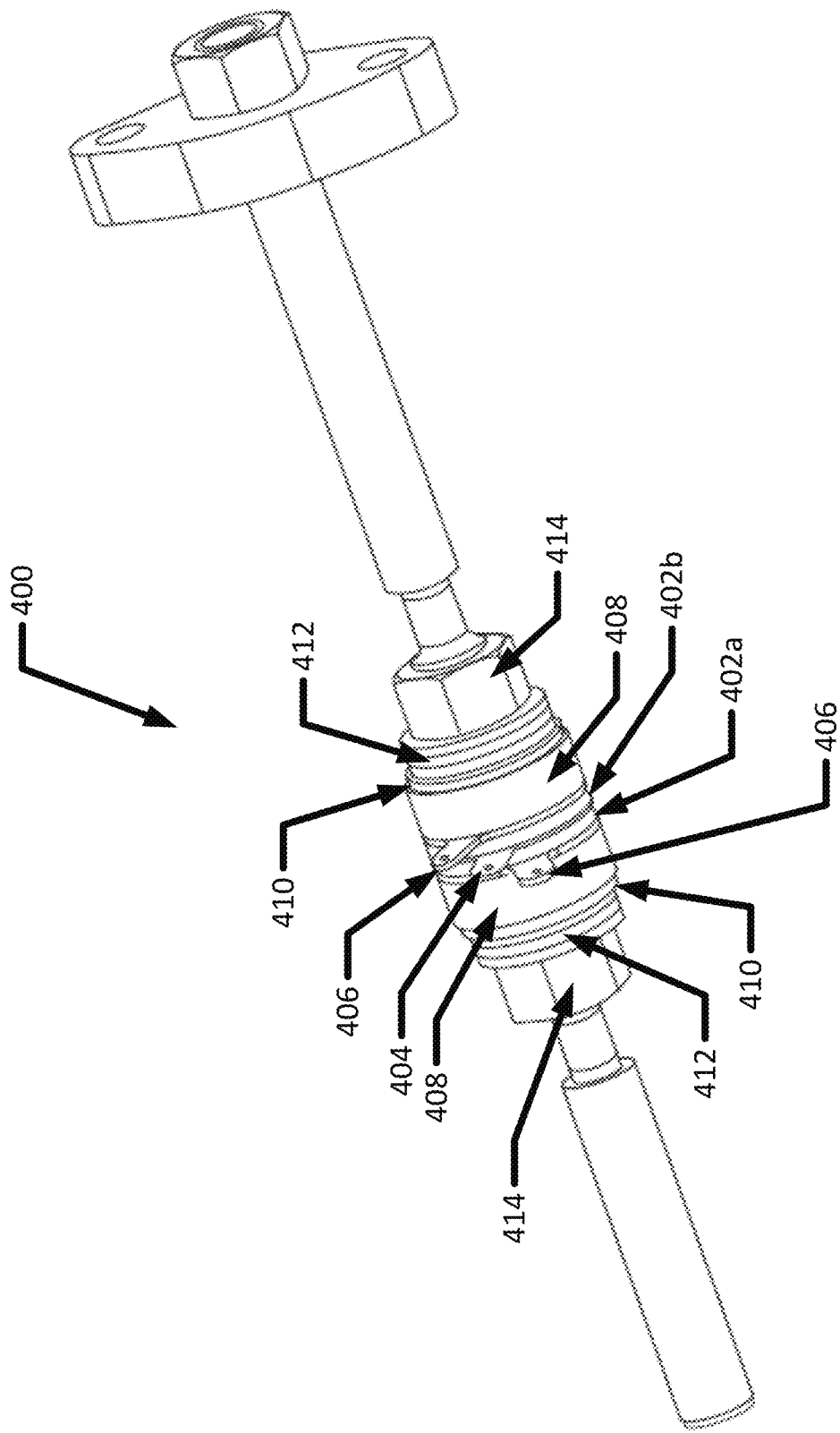
FIG. 6 is a perspective view similar to FIG. 5, with the protective housing over the force transducer assembly removed to reveal the individual elements of the assembly.

In one embodiment, shown in FIGS. 5 and 6, a pair of annular piezoelectric force transducers 402a, 402b are disposed coaxially about the longitudinally centered segment 302 of each for transfer rod 300. The annular force transducers 402a, 402b are separated by an electrically conductive tabbed annular shim 404 onto which an electrical lead (not shown) is coupled for acquiring electrical signals representative of the forces exerted on the transducers. Additional electrically conducive tabbed annular shims 406 with associated electrical leads, are positioned axially outboard from each annular force transducer 402a, 402b, such that each annular force transducer is entrapped between a pair of the annular shims. Retaining elements are disposed on the longitudinally centered segment axially outboard from each of the outboard annular shims. The retaining elements on each side include a rigid annular spacer 408, a generic flat washer 410, and a set of Belleville spring washers 412 selected to maintain a desired preload force on the force transducers 402a, 402b. The retaining elements on each side of the force transducers are secured in place by retaining nuts 414 threaded onto the longitudinally centered segment 302 of the force transfer rod 300. As shown in FIG. 6, the entire assembly of force transducers and retaining elements is preferably enclosed within a protective housing 401.

Figure 7:
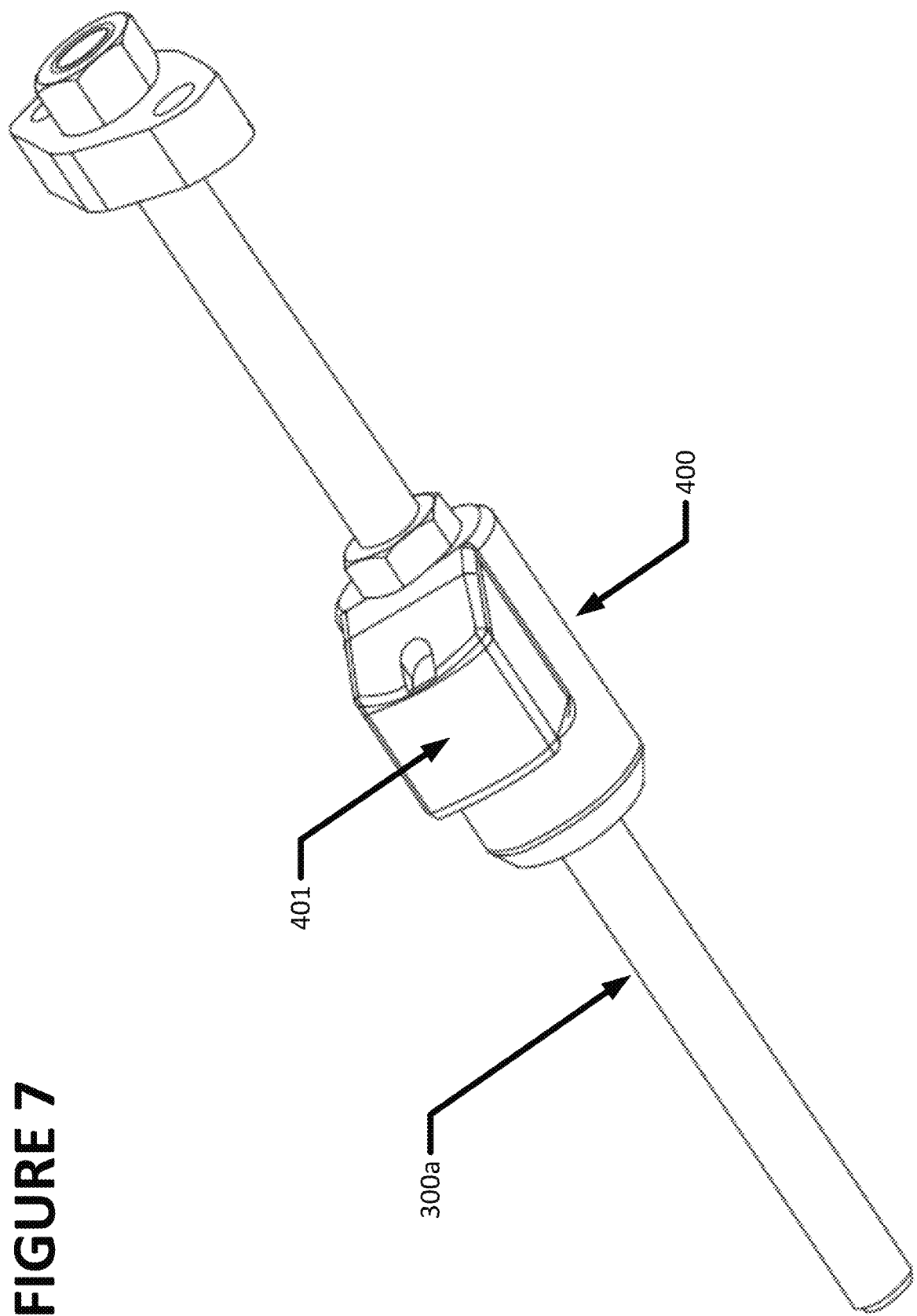
FIG. 7 is a perspective view of an alternate force transfer rod configuration with a force transducer assembly secured to a longitudinally centered segment.
Figure 8:
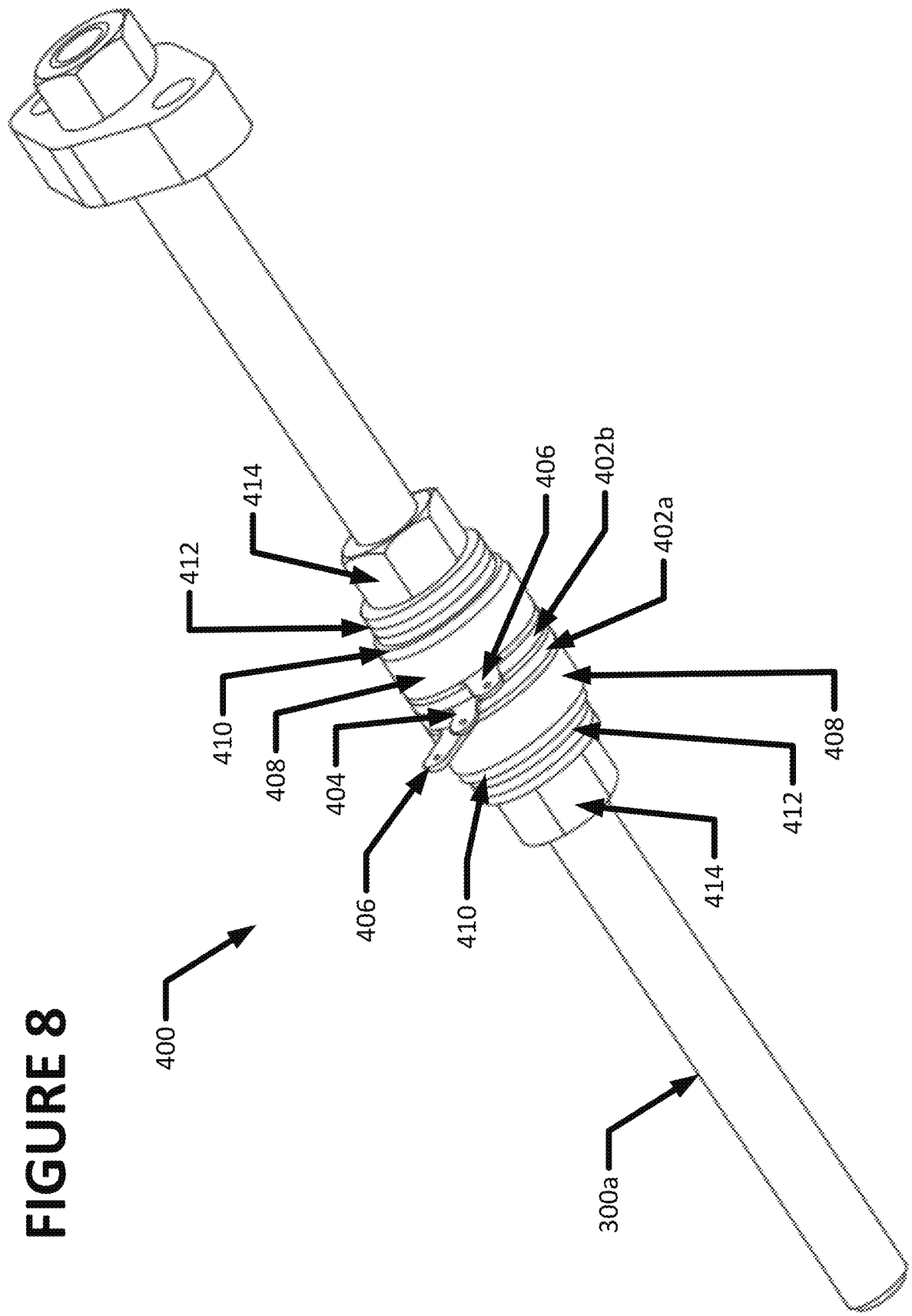
FIG. 8 is a perspective view similar to FIG. 7, with the protective housing over the force transducer assembly removed to reveal the individual elements of the assembly.

In an alternate embodiment, shown in FIGS. 7 and 8, the force transfer rods 300a are formed without a defined longitudinally centered segment. A pair of annular piezoelectric force transducers 402a, 402b are disposed coaxially about a longitudinally centered point of each for transfer rod 300a, at or equidistantly adjacent to a point of minimum bending moment along the longitudinal length of the force transfer rod 300a. The annular force transducers 402a, 402b are separated by an electrically conductive tabbed annular shim 404 onto which an electrical lead (not shown) is coupled for acquiring electrical signals representative of the forces exerted on the transducers. Additional electrically conducive tabbed annular shims 406 with associated electrical leads, are positioned axially outboard from each annular force transducer 402a, 402b, such that each annular force transducer is entrapped between a pair of the annular shims. Retaining elements are disposed on the longitudinally centered segment axially outboard from each of the outboard annular shims. The retaining elements on each side include a rigid annular spacer 408, a generic flat washer 410, and a set of Belleville spring washers 412 selected to maintain a desired preload force on the force transducers 402a, 402b. The retaining elements on each side of the force transducers are secured in place by retaining nuts 414 threaded onto the longitudinally centered segment 302 of the force transfer rod 300a. As shown in FIG. 8, the entire assembly of force transducers and retaining elements is preferably enclosed within a protective housing 401.

Figure 9:
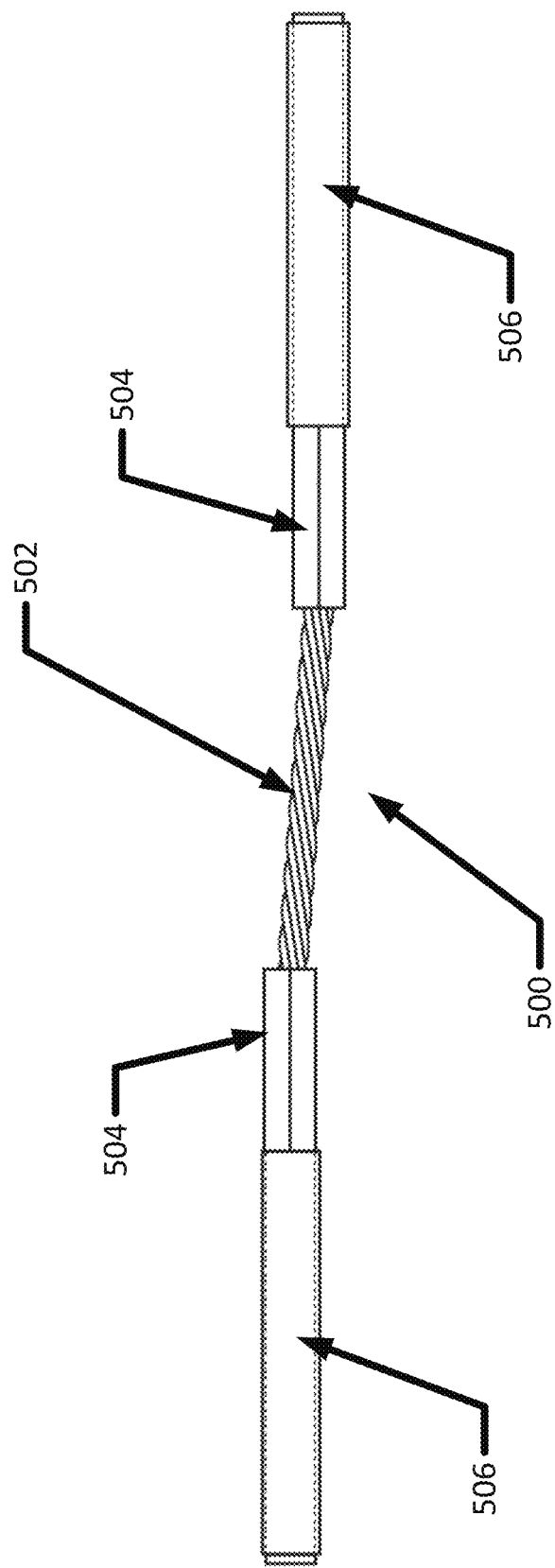
FIG. 9 is a perspective view of an alternate force transfer rod of the present disclosure incorporating a cable segment.
Figure 10:
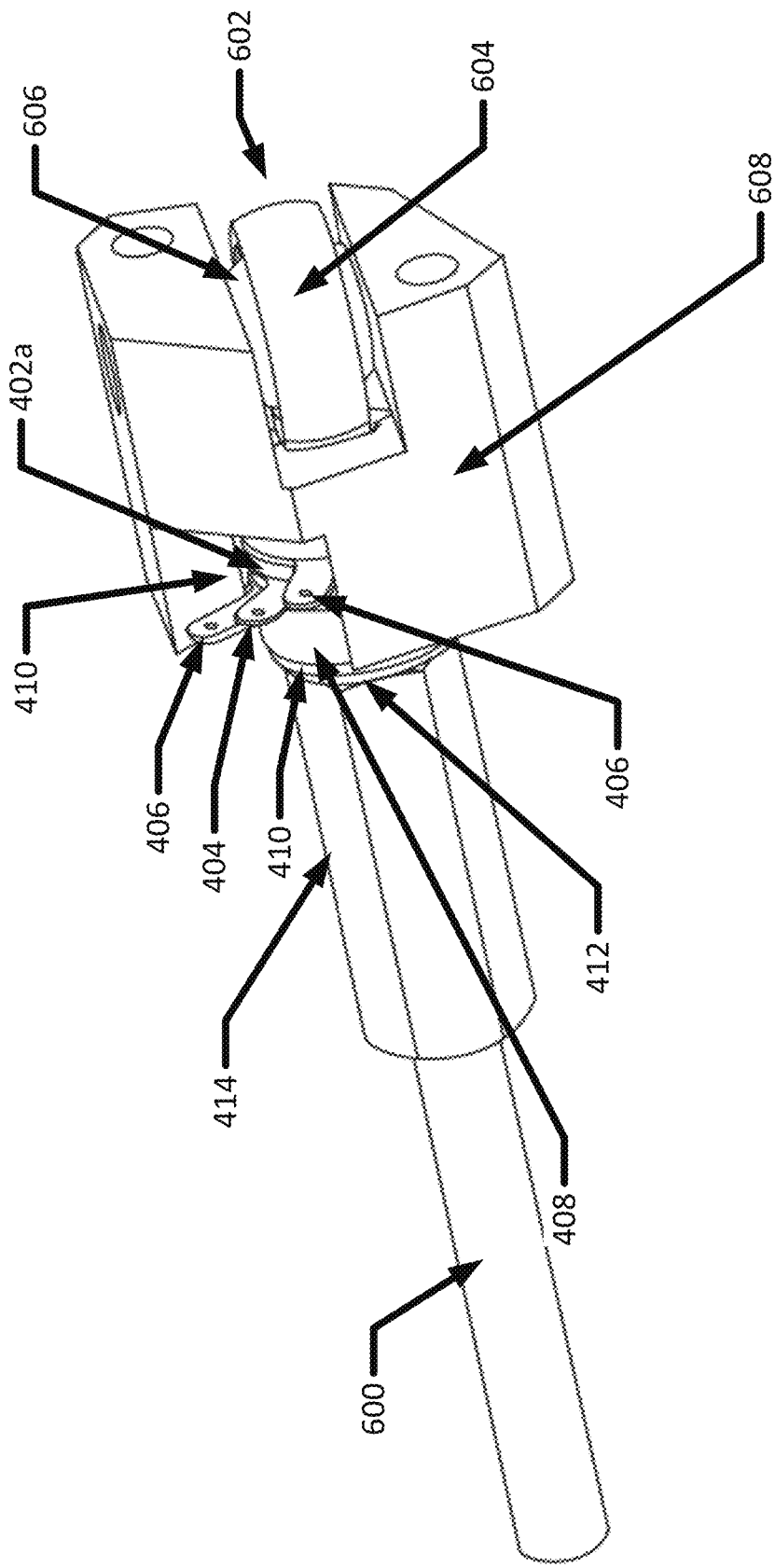
FIG. 10 is a perspective view of an alternate force transfer rod of the present disclosure incorporating a ball and socket couple at one longitudinal end.

Alternative configurations of the force transfer rods which seek to minimize bending moments and which allow the force transfer rod 300 to flex or twist, isolating a portion, but not necessarily the central segment, from lateral (radial) forces while transmitting compression and tension forces (axial loads) are shown in FIGS. 9 and 10. In an embodiment shown in FIG. 9, a force transfer rod 500 secured between a region subjected to the transmitted forces from the spindle 102 and an associated attachment region 208 affixed to the housing 104 is configured to include a cable segment 502 formed from woven multi-strand wire. The cable segment 502 is swage fit at opposite ends into connectors 504 threaded onto rod segments 506. The cable segment 502 transmits fluctuations in tensile force in an axial direction, but flexes to accommodate misalignment and lateral (radial) forces exerted between the opposite ends of the force transfer rod 500. At least one force transducer (not shown) is disposed within a protective housing at one end of the force transfer rod 500. Each force transducer is configured to generate an output signal representative of the fluctuations in tensile force transferred by the force transfer rod 500, such as may occur during rotational movement of the spindle 102. By incorporating the central cable segment 502, the resulting output signals from the force transducers are representative only of compression and/or tension forces, with force contributions due to bending or flexing minimized or eliminated.

In a further embodiment shown in FIG. 10, a rigid force transfer rod 600 secured between a region subjected to the transmitted forces from the spindle 102 and an associated attachment region 208 affixed to the housing 104 is configured to include a connection at one end which permits rotational movement about one or two axis. For example, the rigid force transfer rod 600 may include a ball and socket joint 602 adjacent one end. The ball and socket joint 602 consists of a annular socket 604 secured to an axial end of the force transfer rod, and a ball component 606 seated within the annular socket 604 and secured to a housing block 608. The housing block 608, in turn, is secured in place either to receive transmitted forces from the spindle 102 or to the housing 104. The ball and socket joint 602 is configured to transmit compression and tension forces in an axial direction, but rotates to accommodate misalignment and twisting forces exerted between the opposite ends of the force transfer rod 600. At least one force transducer 610 is located coaxially about an end of the force transfer rod 600 at the longitudinal location of the lowest bending moment, adjacent to the ball and socket joint 602. Each force transducer 610 and is configured to generate an output signal representative of the compression and/or tension forces transferred by the force transfer rod 600, such as may occur during rotational movement of the spindle 102. By incorporating the ball and socket joint 602, the resulting output signals from the force transducers are representative only of compression and/or tension forces, with force contributions due to bending or flexing minimized or eliminated.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle wheel balancer force transfer structure for coupling a rotationally driven spindle assembly to a fixed housing, comprising:
   a vibration structure configured to support one end of said rotationally driven spindle assembly for rotational movement about an axis, said vibration structure secured to said fixed housing at a plurality of rigid attachment points;
   at least one force transfer rod, said force transfer rod secured to said vibration structure at a first end within a region subjected to applied forces during rotational movement and static loading of said spindle assembly, and to a mechanically grounded second end, whereby a portion of said applied forces are conveyed from said spindle assembly to said fixed housing through said at least one force transfer rod; and
   a transducer assembly secured to said at least one force transfer rod within a tolerance of a longitudinal location of minimum bending moment along said at least one force transfer rod, said transducer assembly configured to output an electrical signal responsive to an axial component of said applied force conveyed by said at least one force transfer rod.

2. The vehicle wheel balancer force transfer structure of claim 1 wherein said mechanically grounded second end is secured to a portion of the fixed housing.

3. The vehicle wheel balancer force transfer structure of claim 1 wherein said mechanically grounded second end is secured to a portion of said vibration structure mechanically isolated from said region subjected to said applied forces, and which is adjacent to at least one of said plurality of rigid attachment points.

4. The vehicle wheel balancer force transfer structure of claim 1 wherein said at least one force transfer rod includes a pair of flex regions, said flex regions disposed in a longitudinally spaced configuration to minimize a bending moment over an intervening central segment of said force transfer rod during transfer of said applied forces resulting from rotational movement of said spindle assembly; and
   wherein said transducer assembly is secured to said force transfer rod within said central segment.

5. The vehicle wheel balancer force transfer structure of claim 4 wherein each flex region is defined by an annular relief formed into said associated force transfer rod.

6. The vehicle wheel balancer force transfer structure of claim 4 wherein said intervening segment is longitudinally centered along said associated force transfer rod.

7. The vehicle wheel balancer force transducer structure of claim 1 wherein said transducer assembly is coaxial with said associated force transfer rod, and includes at least one preload element applying an axial preload to at least one annular piezoelectric element, said annular piezoelectric element responsive to said applied forced conveyed by said associated force transfer rod to generate said electrical output signal.

8. The vehicle wheel balancer force transducer structure of claim 7 wherein said transducer assembly includes a pair of annular piezoelectric elements disposed between a pair of annular preload elements, said annular preload elements applying an axial preload to said pair of annular piezoelectric elements.

9. The vehicle wheel balancer force transducer structure of claim 8 wherein said transducer assembly further includes an annular rigid spacer element disposed between each of said annular preload elements and said pair of annular piezoelectric elements.

10. The vehicle wheel balancer force transducer structure of claim 1 wherein said vibration structure includes a front planar member oriented orthogonal to an axis of rotation for said rotationally driven spindle, said front planar member supporting said end of said rotationally driven spindle;
wherein said front planar member includes a channel excised between a first portion of said front planar member supporting said end of said rotationally driven spindle, and a second portion of said front planar member defining said mechanically grounded component, said second portion secured to said fixed housing by at least one of said rigid attachment points; and
wherein said at least one force transfer rod is coupled between said first and second portions of said front planar member.

11. The vehicle wheel balancer force transducer structure of claim 10 wherein said vibration structure includes a brace member extending from said first portion of said front planar member to a second planar member, said second planar member oriented parallel to said front planar member;
wherein said second planar member includes a channel excised between a first portion of said second planar member coupled to said rigid brace, and a second portion of said second planar member defining a second mechanically grounded component secured to said fixed housing by at least one of said rigid attachment points; and
wherein at least a second force transfer rod is coupled between said first and second portions of said second planar member.

12. The vehicle wheel balancer force transfer structure of claim 1 wherein said longitudinal location of minimum bending moment along said associated force transfer rod is located within a longitudinally centered segment of said associated force transfer rod.

13. A method for measuring imbalance forces exerted by a wheel assembly axially secured for rotation about an axis of a spindle of a vehicle wheel balancer, comprising:
supporting one end of said spindle, axially opposite from said wheel assembly, within a vibration structure;
rotating said spindle to drive said wheel assembly about said spindle axis of rotation;
during said rotation of said spindle and wheel assembly, transferring through at least one connecting rod to a mechanically grounded mounting, a portion of an imbalance force received at said vibration structure from said spindle and wheel assembly; and
generating a signal representative of said transferred portion of said imbalance force within a region of minimum bending moment along a longitudinal axis of said at least one connecting rod.

14. The method of claim 13 further including providing said at least one connecting rod, at opposite longitudinal ends of said region of minimum bending moment, flex regions limiting transmission of lateral or radial forces, while transferring axial or longitudinal forces.

15. The method of claim 13 wherein said region of minimum bending moment along said longitudinal axis of said at least one connecting rod is located within a longitudinally centered segment of said at least one connecting rod.

16. A vehicle wheel balancer force transfer structure for coupling a rotationally driven spindle assembly to a fixed housing, comprising:
a vibration structure configured to support one end of said rotationally driven spindle assembly for rotational movement about an axis, said vibration structure secured to said fixed housing at a plurality of rigid attachment points;
at least one force transfer rod, said force transfer rod secured to said vibration structure at a first end within a region subjected to applied forces during rotational movement and static loading of said spindle assembly, and to a mechanically grounded second end, whereby a portion of said applied forces are conveyed from said spindle assembly to said fixed housing through said at least one force transfer rod;
wherein said at least one force transfer rod includes a pair of flex regions, said flex regions disposed in a longitudinally spaced configuration; and
a transducer assembly secured to said at least one force transfer rod between said flex regions, said transducer assembly configured to output an electrical signal responsive to an axial component of said applied force conveyed by said at least one force transfer rod.

* * * * *